(12) United States Patent  
Han et al.

(10) Patent No.: US 8,259,559 B2  
(45) Date of Patent: Sep. 4, 2012

(54) METHOD AND APPARATUS FOR TRANSMITTING AND RECEIVING DATA IN AN ORTHOGONAL FREQUENCY MULTIPLEXING SYSTEM

(75) Inventors: Jin-Kyu Han, Seoul (KR); Joon-Young Cho, Suwon-si (KR); Hwan-Joon Kwon, Suwon-si (KR); Ju-Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1117 days.

(21) Appl. No.: 12/112,309

(22) Filed: Apr. 30, 2008

(65) Prior Publication Data

US 2008/0273491 A1    Nov. 6, 2008

(30) Foreign Application Priority Data

May 4, 2007    (KR) .................. 10-2007-0043782

(51) Int. Cl.  
*H04J 11/00*    (2006.01)

(52) U.S. Cl. .................. 370/203; 370/465; 375/130

(58) Field of Classification Search .................. None  
See application file for complete search history.

(56) References Cited

U.S. PATENT DOCUMENTS

| 7,460,466 | B2 * | 12/2008 | Lee et al. | 370/208 |
|---|---|---|---|---|
| 7,929,417 | B2 * | 4/2011 | Jung et al. | 370/210 |
| 2004/0264362 | A1 * | 12/2004 | Rhodes | 370/208 |
| 2005/0032514 | A1 | 2/2005 | Sadri et al. | |
| 2005/0157638 | A1 | 7/2005 | Maltsev et al. | |
| 2006/0146867 | A1 * | 7/2006 | Lee et al. | 370/465 |
| 2006/0203711 | A1 * | 9/2006 | Oh et al. | 370/208 |
| 2008/0267318 | A1 * | 10/2008 | Ihm et al. | 375/299 |
| 2009/0052381 | A1 * | 2/2009 | Gorokhov et al. | 370/329 |
| 2009/0279589 | A1 * | 11/2009 | Nguyen | 375/141 |
| 2010/0020889 | A1 * | 1/2010 | Tamaki et al. | 375/260 |

FOREIGN PATENT DOCUMENTS

WO    WO 2005/006698    1/2005

* cited by examiner

*Primary Examiner* — Robert Scheibel  
(74) *Attorney, Agent, or Firm* — The Farrell Law Firm, P.C.

(57) ABSTRACT

A method and apparatus for transmitting and receiving data in an Orthogonal Frequency Division Multiplexing (OFDM) system are provided, in which a Base Station (BS) generates a signal of a broadcast channel, determines whether the broadcast channel signal includes Reference Symbols (RSs) used for channel estimation, determines to apply a maximal puncturing pattern to a Resource Block that defines the broadcast channel, if the broadcast channel signal includes Rs, includes puncturing information about a downlink signal in the broadcast channel signal, maps the broadcast channel signal including the puncturing information to Resource Elements according to the maximal puncturing pattern, and transmits the mapped broadcast channel signal.

13 Claims, 10 Drawing Sheets

METHOD AND APPARATUS FOR TRANSMITTING AND RECEIVING DATA IN AN ORTHOGONAL FREQUENCY MULTIPLEXING SYSTEM

PRIORITY

This application claims priority under 35 U.S.C. §119(a) to a Korean Patent Application filed in the Korean Intellectual Property Office on May 4, 2007 and assigned Serial No. 2007-43782, the contents of which are incorporated herein by reference.

BACKGROUND OF THE INVENTION

1. Field of the Invention

The present invention relates generally to a multiple access communication system, and more particularly, to a method and apparatus for transmitting and receiving data in an Orthogonal Frequency Division Multiplexing (OFDM) system.

2. Description of the Related Art

Having gained recent prominence in high-speed data transmission over wired/wireless channels, OFDM is a particular type of Multi-Carrier Modulation (MCM). In OFDM, a serial symbol sequence is converted to parallel symbol sequences and modulated to mutually orthogonal subcarriers or sub-channels, prior to transmission.

The first MCM systems appeared in the late 1950's for military High Frequency (HF) radio communication, and OFDM with overlapping orthogonal subcarriers was initially developed in the 1970's. Since it is difficult to orthogonally modulate between multiple carriers, OFDM has limitations in applications to real systems. However, in 1971, Weinstein, et al's disclosure of an OFDM scheme that applies Discrete Fourier Transform (DFT) to parallel data transmission as an efficient modulation/demodulation process, was a driving force behind the development of OFDM. Also, the introduction of a guard interval and a Cyclic Prefix (CP) as a guard interval further mitigated adverse effects of multi-path propagation and delay spread on systems.

Accordingly, OFDM has been utilized in various fields of digital data communications such as Digital Audio Broadcasting (DAB), digital TV broadcasting, Wireless Local Area Network (WLAN), and Wireless Asynchronous Transfer Mode (WATM). Although hardware complexity was an obstacle to the widespread use of OFDM, recent advances in digital signal processing technology including Fast Fourier Transform (FFT) and Inverse Fast Fourier Transform (IFFT) have enabled OFDM implementation.

OFDM, similar to Frequency Division Multiplexing (FDM), has an advantage of optimum transmission efficiency in high-speed data transmission, in part because it transmits data on sub-carriers, maintaining orthogonality among them. Particularly, efficient frequency use attributed to overlapping frequency spectrums and robustness against frequency selective fading and multi-path fading further increase the transmission efficiency in high-speed data transmission. OFDM reduces the effects of Inter-Symbol Interference (ISI) by use of guard intervals and enables design of a simple equalizer hardware structure. Furthermore, since OFDM is robust against impulsive noise, it is increasingly utilized in communication system configurations.

High-speed, high-quality data services in wireless communications are generally impeded by factors related to the channel environment. The channel environment often changes due to Additive White Gaussian Noise (AWGN), a fading-incurred change in the power of a received signal, shadowing, Doppler effects caused by movement of a Mobile Station (MS) and frequent changes in its velocity, and interference from other users and multi-path signals. Therefore, it is critical to effectively overcome the factors to support high-speed, high-quality data services in wireless communications.

In OFDM, a modulated signal is delivered in the two-dimensional resources of time and frequency. Time resources are distinguished by different OFDM symbols that are mutually orthogonal, and frequency resources are distinguished by different tones that are also mutually orthogonal. A minimum resource unit can be defined with an OFDM symbol on the time axis and a tone on the frequency axis. This is referred to as a "time-frequency bin". Different time-frequency bins are orthogonal, which prevents signals in the time-frequency bins from interfering with each other in reception.

Under a mobile communication environment, channels change randomly. To avert the resulting problems, most mobile communication systems are designed so as to estimate the channel state of a channel and compensate the channel. This process is called coherent demodulation. For estimation of a random channel state, a signal preset between a transmitter and a receiver should be transmitted. This signal is a pilot signal or a Reference Symbol (RS) signal. The receiver estimates the channel state of the RS signal received from the transmitter and compensates the estimated channel state, for demodulation. As much of the RS signal as sufficient for estimation of a channel change should be transmitted, preferably without being damaged by a data signal. An OFDM system positions the RS signal in time-frequency bins to prevent damage of the RS signal.

FIG. 1 illustrates a conventional RS pattern for two transmit antennas, as defined for a $3^{rd}$ Generation Partnership Project (3GPP) Long Term Evolution (LTE) system.

Referring to FIG. 1, one Resource Block (RB) is composed of 12 tones in frequency and 14 OFDM symbols in time. In FIG. 1, a bandwidth having a total of N RBs, first to $N^{th}$ RBs 121 to 123 (RB 1 to RB N) is shown.

Time-frequency bins 131 marked with "a" represent RSs transmitted through a first antenna, and time-frequency bins 133 marked with "b" represent RSs transmitted through a second antenna. For a single transmit antenna in a Base Station (BS), the time-frequency bins 133 will be used for data transmission. Since the RS signal is preset between the BS and an MS, the MS estimates a channel from the first transmit antenna based on signals received in the time-frequency bins 131 and a channel from the second transmit antenna based on signals received in the time-frequency bins 133.

In the RS pattern illustrated in FIG. 1, some OFDM symbols have RSs and other OFDM symbols are without RSs. Specifically, RSs are defined in $1^{st}$, $5^{th}$, $8^{th}$ and $12^{th}$ OFDM symbols 101, 103, 105 and 107, whereas the other OFDM symbols 111, 113, 115 and 117 are free of RSs. For one transmit antenna, an RS is inserted every six tones, and for the other transmit antenna, RSs are inserted in other RS tones.

FIG. 2 illustrates a conventional RS pattern for four transmit antennas.

Referring to FIG. 2, RSs 131 for a first transmit antenna and RSs 133 for a second transmit antenna are inserted at the same positions as illustrated in FIG. 1. RSs 135 and RSs 136 are additionally defined for third and fourth transmit antennas, respectively. Since the added RSs are positioned in $2^{nd}$ and $8^{th}$ OFDM symbols 201 and 203, six OFDM symbols 103, 105, 107, 201 and 203 have RSs among a total of 14 OFDM symbols. The other OFDM symbols 211, 213, 215 and 217 do not have RSs.

To ensure the channel estimation performance of the MS, sufficient power should be allocated to the RS signal. Specifically, when data is transmitted to an MS in a poor channel state, sufficient RS power should be secured because the Signal-to-Noise Ratio (SNR) of the RS signal cannot be improved by retransmission, compared to data for which a certain SNR can be ensured by retransmission. In this context, RS power allocation takes priority over data power allocation. Hence, it may occur that due to allocation of enough power to the RS signal, an available power per data tone is lower in an OFDM symbol with RSs than in an OFDM symbol without RSs.

FIG. 3 illustrates a conventional example of power allocation to data tones in relation to RS power allocation, for a single transmit antenna.

Referring to FIG. 3, reference numeral 301 denotes an OFDM symbol with RSs in an RB, and reference numeral 303 denotes an OFDM symbol without RSs in the RB. The OFDM symbol 301 corresponds to one of the OFDM symbols 101, 103, 105 and 107 illustrated in FIG. 1. The OFDM symbol 301 includes RS tones 311 and data tones 313, while the OFDM symbol 303 has only data tones 315. Power P is allocated to each RS tone 311, higher than power D allocated to each data tone 315 in the OFDM symbol without RSs. In the RB, the condition that a power sum is equal in every OFDM symbol is expressed in Equation (1) as $$N_{RS} \times P + (N - N_{RS}) \times D^* = N \times D \quad (1)$$

where N denotes the number of tones per OFDM symbol, $N_{RS}$ denotes the number of RS tones in an OFDM symbol with RSs, and $D^*$ denotes the power of each data tone in the OFDM symbol with RSs. In FIG. 3, N=12 and $N_{RS}$=2.

If P>D, DA*<D because N>$N_{RS}$. That is, as expressed in Equation (2), $$P - D = (N/N_{RS} - 1) \times (D - D^*) > 0 \quad (2)$$

As described above, the power level of a data tone in the OFDM symbol with RSs is lower than that of a data tone in the OFDM symbol without RSs. Nonetheless, enough power should be allocated first to RSs for reliable communications of every MS in a cell.

SUMMARY OF THE INVENTION

An aspect of the present invention is to address at least the problems and/or disadvantages and to provide at least the advantages described below. Accordingly, an aspect of the present invention is to provide a method and apparatus for preventing the degradation of system performance by keeping the transmit power of a data tone equal in every OFDM symbol through Resource Element (RE) puncturing based on RS power allocation.

An aspect of the present invention provides a method and apparatus for enabling efficient transmit power allocation by explicitly or implicitly notifying RE puncturing information.

An aspect of the present invention provides a method and apparatus for eliminating obscurities in reception by implementing an RE puncturing for channels to be received before acquiring RE puncturing information.

In accordance with the present invention, there is provided a method for transmitting data to an MS in a BS in an OFDM system, in which a signal of a broadcast channel is generated, it is determined whether the broadcast channel signal includes RSs used for channel estimation, it is determined to apply a maximal puncturing pattern to an RB that defines the broadcast channel, if the broadcast channel signal includes RSs, puncturing information about a downlink signal is included in the broadcast channel signal, the broadcast channel signal including the puncturing information is mapped to REs according to the maximal puncturing pattern, and the mapped broadcast channel signal is transmitted.

In accordance with the present invention, there is provided a method for receiving data from a BS in an MS in an OFDM system, in which synchronization is acquired from a signal received on a synchronization channel, modulation symbols of a first broadcast channel are extracted from an RB that defines the first broadcast channel, on the assumption that a maximal puncturing pattern was applied to the RB that defines the first broadcast channel, RSs for channel estimation of the first broadcast channel are extracted from the RB that defines the first broadcast channel, a state of the first broadcast channel is estimated using the RSs, a signal of the first broadcast channel is demodulated and decoded using the channel estimate of the first broadcast channel, puncturing information about a downlink signal is acquired from the decoded first broadcast channel signal, and a signal of a second broadcast channel is received using the puncturing information.

In accordance with the present invention, there is provided an apparatus for transmitting data to an MS in a BS in an OFDM system, in which an RS generator generates RSs for channel estimation, a synchronization channel signal generator generates a synchronization channel signal required for the MS to acquire synchronization to the BS, a broadcast channel signal generator generates a broadcast channel signal including system information and RE puncturing information based on RS power allocation, a mapper maps the RSs, the synchronization channel signal and the broadcast channel signal received from the RS generator, the synchronization channel signal generator, and the broadcast channel signal generator to allocated resources, multiplexes the mapped signals, and transmits the multiplexed signal to the MS, and a controller controls the mapper to apply a maximal puncturing pattern to an RB that defines a broadcast channel, if the broadcast channel signal includes RSs.

In accordance with the present invention, there is provided an apparatus for receiving data from a BS in an MS in an OFDM system, in which a demapper demaps symbols from a multiplexed signal received from the BS on a channel basis, a synchronization channel receiver acquires information for synchronization to the BS from the demapped symbols, an RS receiver acquires RSs for channel estimation from the demapped symbols, a broadcast channel receiver acquires, from the demapped symbols, system information and RE puncturing information based on power allocation to the RSs, a channel estimator calculates a channel estimate for receiving a synchronization channel signal and a broadcast channel signal using the RSs, and a controller controls the demapper to extract modulation symbols of a broadcast channel in an RB that defines the broadcast channel on the assumption that a maximal puncturing pattern was applied to the RB that defines the broadcast channel.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

RE puncturing is one scheme for keeping the power sum of every OFDM symbol below a maximum power while setting the data tone power of an OFDM symbol with RSs to be equal to that of an OFDM symbol without RSs. RE puncturing transmits no data in any part of the data tones of the OFDM symbol with RSs, if the power sum of the OFDM symbol with RSs exceeds the maximum power. If despite allocation of enough power to RSs, both the power sums of the OFDM symbol with RSs and the OFDM symbol without RSs are less than or equal to the maximum power, there is no need for RE puncturing.

Setting every data tone to an equal power level causes a performance gain. Considering channel coding is optimized for an AWGN channel, it is preferred in terms of channel coding performance that a coded packet experiences a constant channel response. If data tones do not have equal power, this amounts to artificial setting of inconsistent channel responses. Therefore, setting data tones to have an equal transmit power during transmission is preferable in terms of system performance.

Meanwhile, a receiver should set a threshold based on the power of a data tone relative to that of an RS during demodulation and decoding. If the transmit power of a data tone is not constant, the threshold is not reliable, thereby degrading reception performance.

Figure 1:
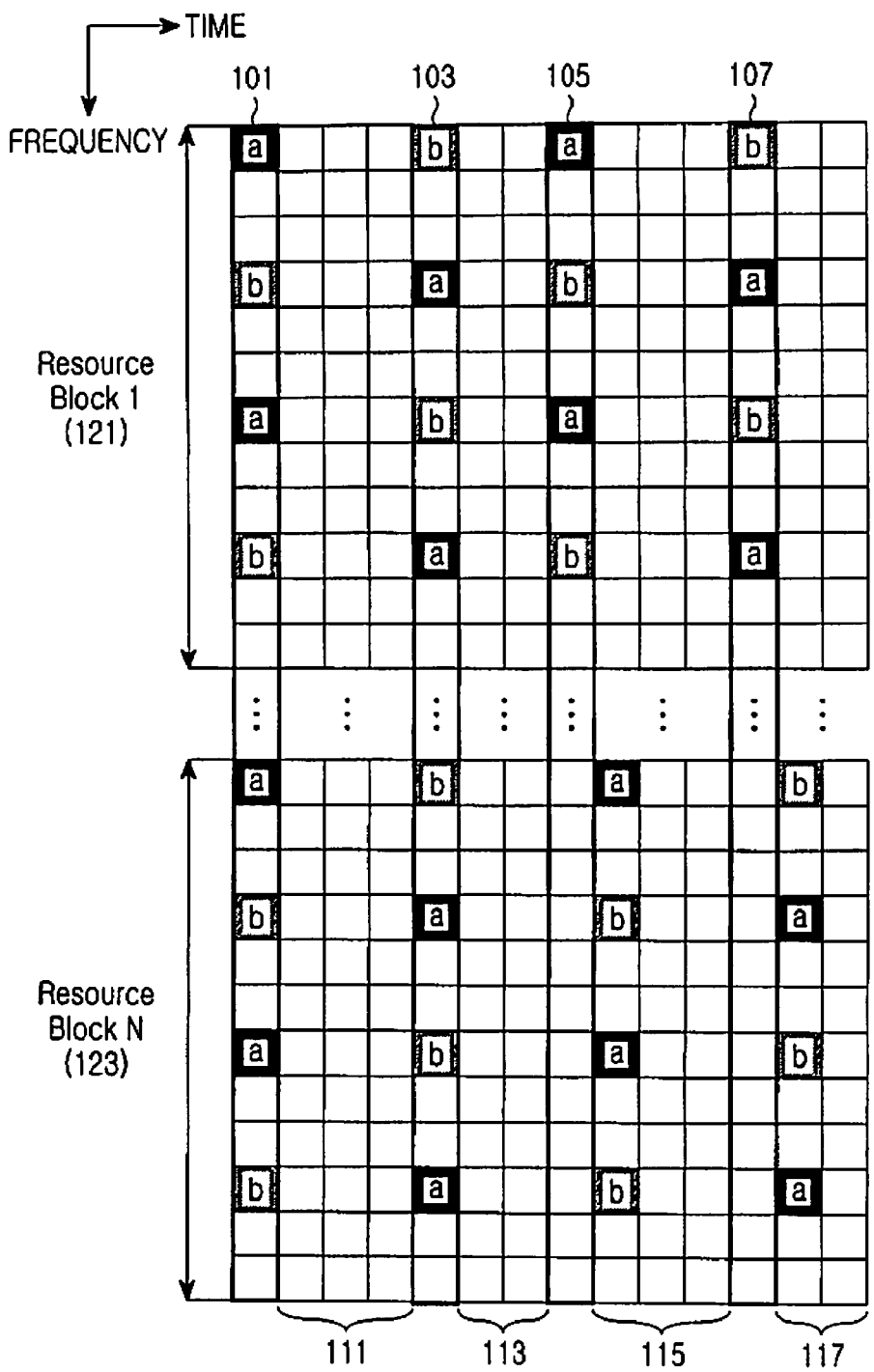
FIG. 1 illustrates a conventional RS pattern for two transmit antennas.
Figure 2:
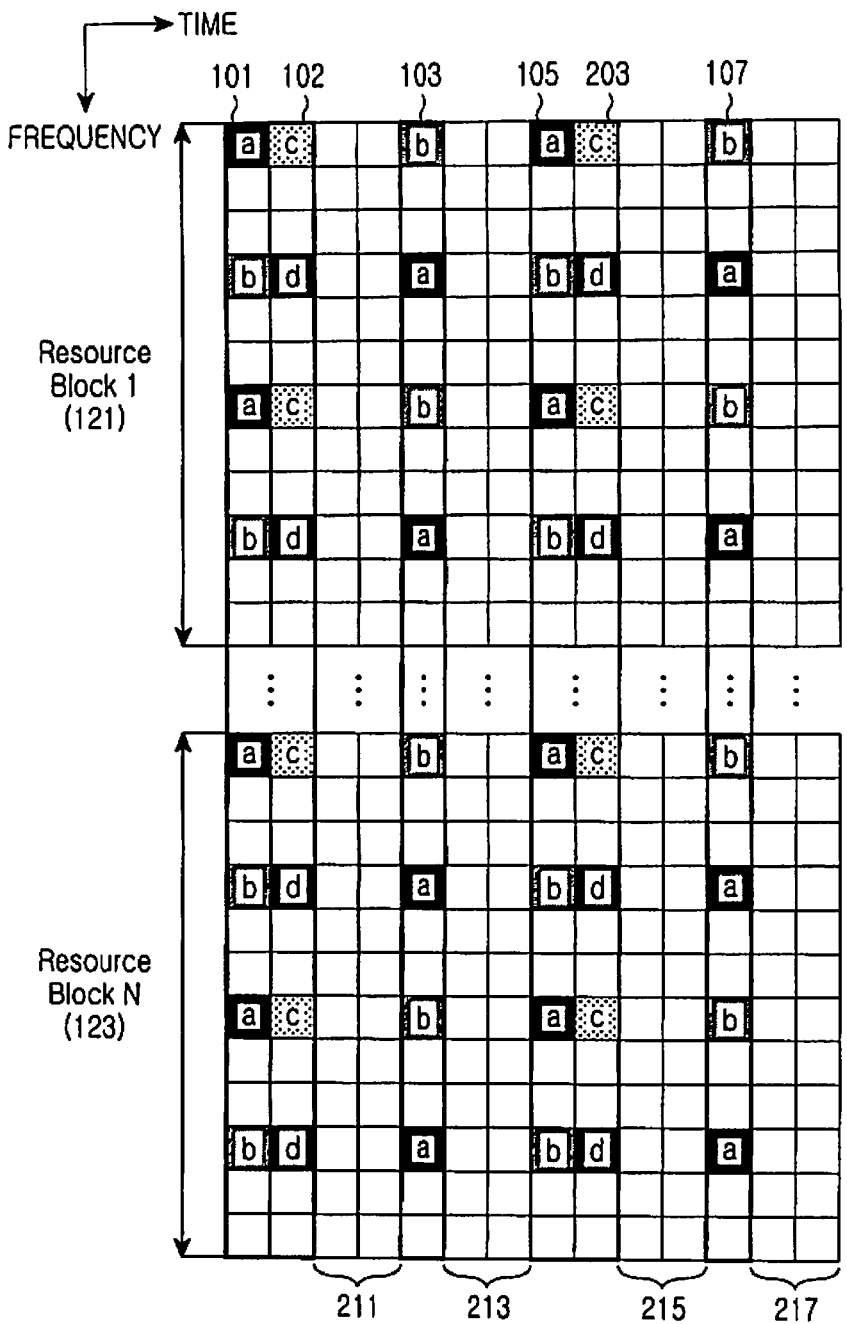
FIG. 2 illustrates a conventional RS pattern for four transmit antennas.
Figure 3:
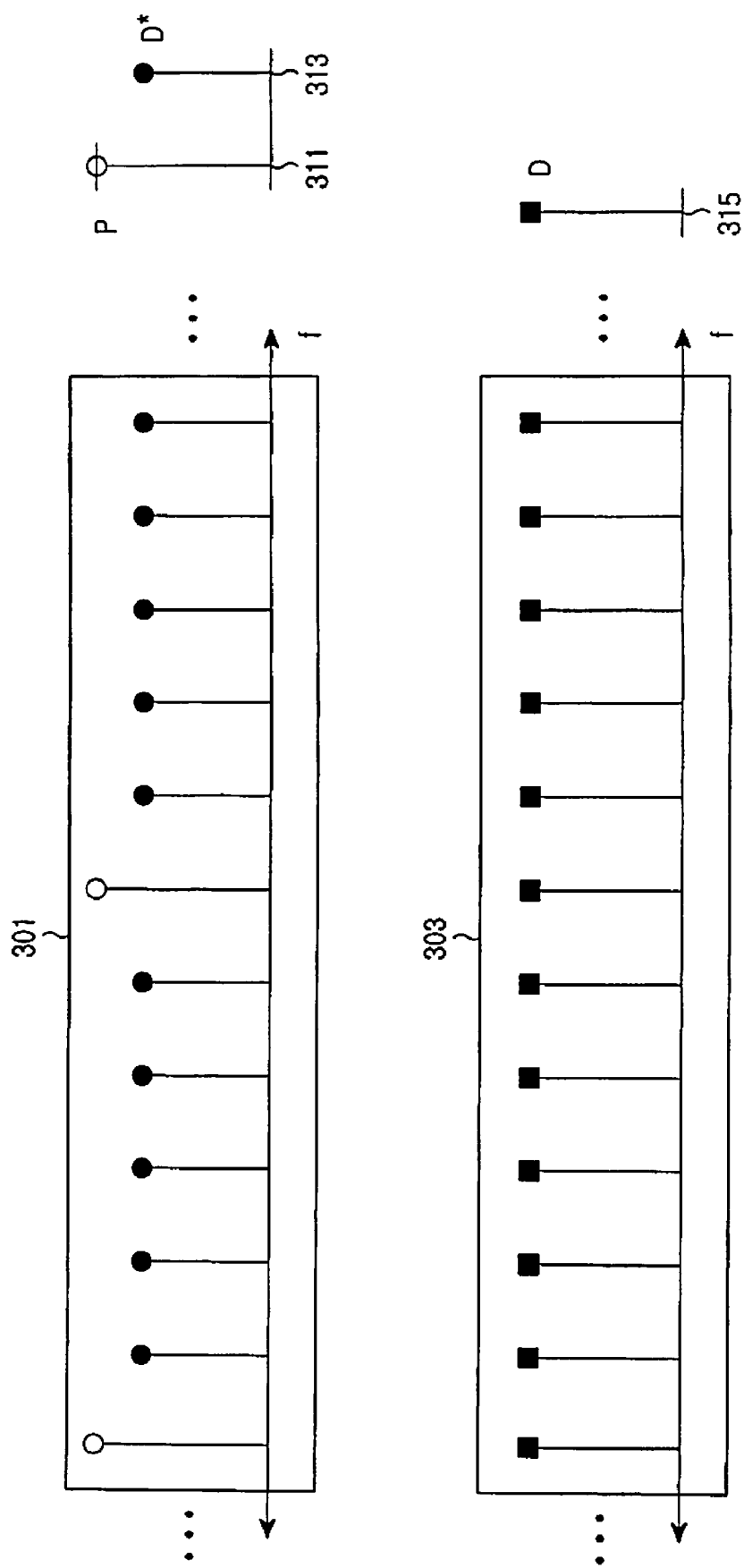
FIG. 3 illustrates a conventional power allocation to data tones in relation to RS power allocation.
Figure 4:
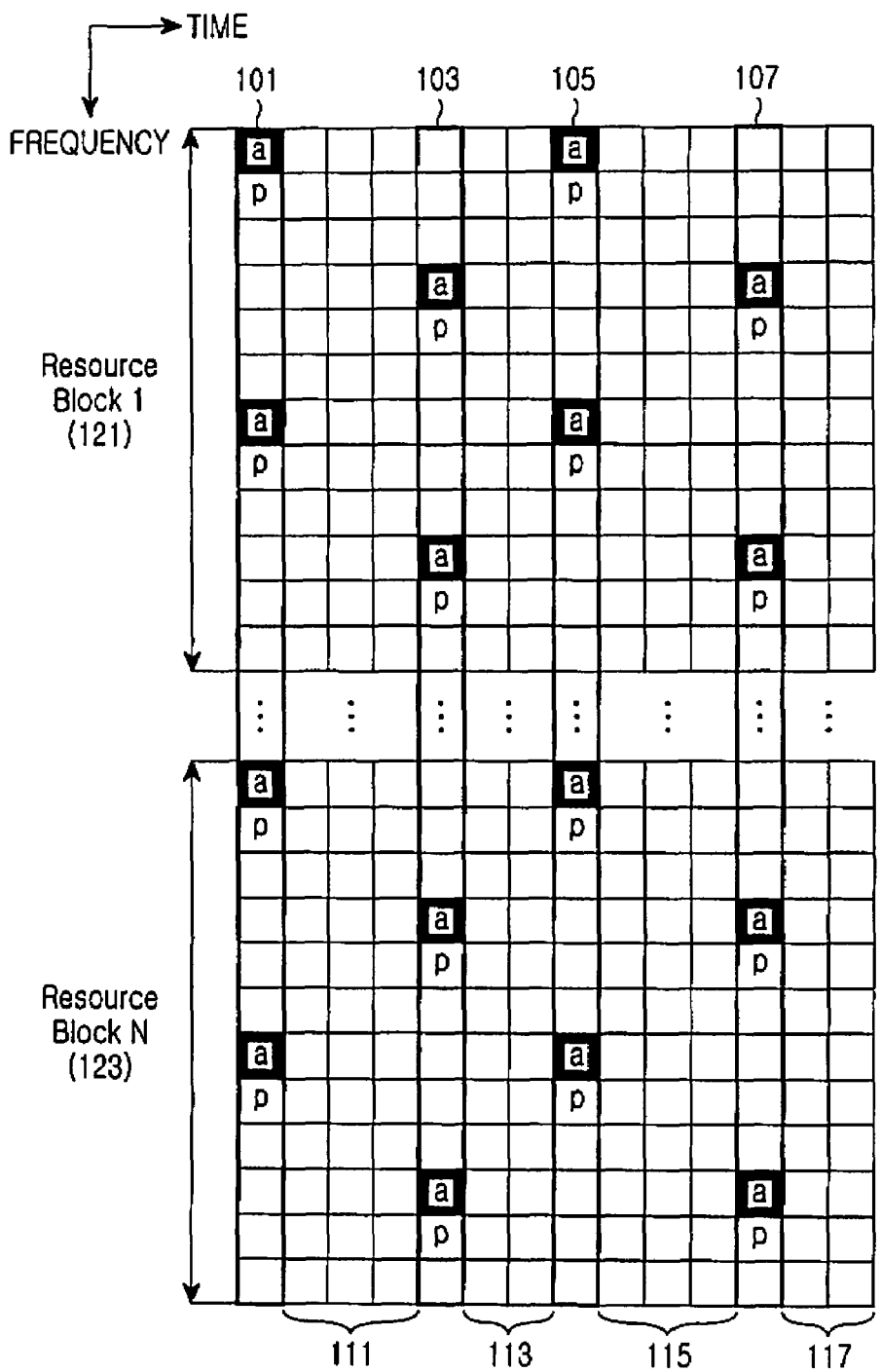
FIG. 4 illustrates RE puncturing based on RS power allocation according to the present invention.

FIG. 4 illustrates an RE puncturing scheme based on RS power allocation according to the present invention.

An RE is defined as a tone in an OFDM symbol. In the illustrated case of FIG. 4, for a single transmit antenna, RSs 131 are disposed and an RS resource density is 1/18. Particularly, an OFDM symbol with RSs has an RS resource density of 1/6 since an RS is inserted every six REs. If a power allocated to RSs in the OFDM symbol with RSs is 1/6 or less of a total available transmit power, there is no need for RE puncturing based on RS power allocation. On the other hand, REs are punctured in a one-to-one-correspondence to RSs.

When a power allocated to RSs exceeds 1/6 and is equal to or less than 1/3 of the total available transmit power in the OFDM symbol with RSs, the one-to-one RE puncturing takes place. If the RS-allocated power exceeds 1/3 and is equal to or less than 1/2 of the total available transmit power, two REs are punctured for every RS. In FIG. 4, an RE puncturing pattern is designed such that an RE 325 adjacent to each RS 131 is punctured. The other REs 327 are used for delivering data. The RE puncturing applies only to OFDM symbols with RSs 101, 103, 105 and 107 in order to avoid the occurrence that the power of REs used for data transmission is lower in an OFDM symbol with RSs than in an OFDM symbol without RSs due to the RS power allocation.

As noted from FIG. 4, RE puncturing is related to RS power allocation, which is in turn related to BS setting. A minimum transmit power needed to allow an MS at a cell boundary to receive a control signal and a data signal is guaranteed to RSs. Yet, the RS power requirement may differ in cells. This means that an RE puncturing density or an RE puncturing pattern may differ in cells. The BS notifies an MS of the RE puncturing density or pattern explicitly, or implicitly by RS power allocation.

Explicitly or implicitly, the BS should notify every MS within its cell of a value specific to the BS. That is, RE puncturing information is specific to the BS and common to the MSs within the same cell. Accordingly, the RE puncturing information should be transmitted on a channel common to all MSs. A Synchronization CHannel (SCH) and a Broadcast CHannel (BCH) are suitable for this function.

There are two types of SCHs, Primary SCH (P-SCH) and Secondary SCH (S-SCH). The MS acquires synchronization to the BS and part of cell IDentification (ID) information about the BS by receiving the P-SCH from the BS. Then the MS acquires the other cell ID information by receiving the S-SCH from the BS and thus it is aware of the cell ID of the BS and information required for BCH reception. The BCH reception information may include frame time information and the number of transmit antennas.

The MS can find out when the BCH will be transmitted from the frame time information and determine a transmit diversity scheme used for the BCH transmission from the number of transmit antennas. If the system is so designed as to obviate the need for notifying the transmit diversity scheme of BCH transmission, there is no need for writing information about the number of transmit antennas in the S-SCH. As the SCHs deliver more information, it is more difficult for them to serve the original purpose of synchronization acquisition. Hence, substantial amounts of information cannot be inserted in the SCHs.

Two types of BCHs exist, Primary BCH (P-BCH) and Secondary BCH (S-BCH). The P-BCH carries system bandwidth information, information about the number of transmit antennas, and information about the position of the S-BCH. Many bandwidths are defined for the LTE system, including 1.25, 2.5, 5, 10 and 20 MHz. One of the bandwidths is indicated by the P-BCH. In other words, the MS cannot know the system bandwidth until it receives the P-BCH.

Figure 5:
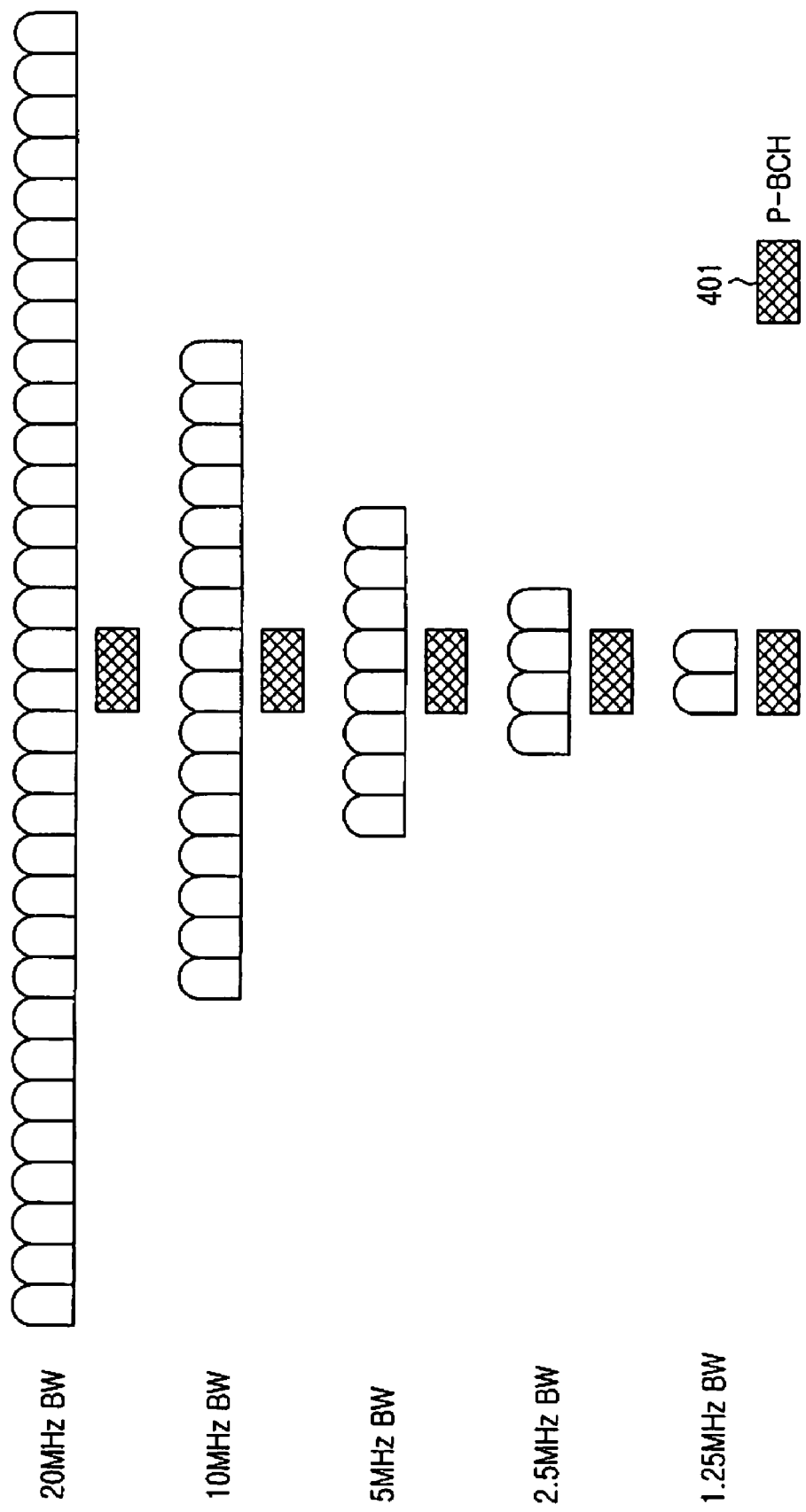
FIG. 5 illustrates the frequency positions of a Primary Broadcast Channel (P-BCH) in respective system bandwidths according to the present invention.

FIG. 5 illustrates the frequency positions of the P-BCH in respective bandwidths according to the present invention.

Since the MS receives the P-SCH, the S-SCH, and the P-BCH without knowledge of a system bandwidth used by the BS, these channels should be transmitted in a central frequency band and the MS can find out the system bandwidth after receiving the P-BCH. Referring to FIG. 5, therefore, the BS transmits a P-BCH 401 along with the P-SCH and the S-SCH in a central 1.25-MHz band of a frequency band.

Unless the S-SCH delivers information about the number of transmit antennas, the BS should notify the number of transmit antennas by the P-BCH. Because the MS is already aware of the system bandwidth by the P-BCH, the S-BCH is not necessarily transmitted in the central frequency band. That is, the S-BCH can be transmitted in any RB. In this case, information about the RB should be transmitted in the P-BCH. Accordingly, the MS finds out the position of the S-BCH from the P-BCH. The S-BCH is used to carry other system information that the P-BCH does not deliver.

Information about RS allocation power-based RE puncturing (i.e. RE puncturing information) should be transmitted in one of the P-SCH, the S-SCH, the P-BCH and the S-BCH. Considering the main purpose of the SCHs is to enable the MS to acquire synchronization and their secondary purpose is to transmit minimum information required for BCH reception at the MS, either the P-SCH or the S-SCH is not preferable for carrying the RE puncturing information. If an SCH transmits the RE puncturing information, more power and resources should be allocated to the SCH to make the SCH more robust, which is inefficient. Therefore, the RE puncturing information is preferably transmitted on the P-BCH or the S-BCH.

The MS has no knowledge of the RE puncturing scheme used by the BS until it receives RE puncturing information based on RS power allocation. If the RE puncturing information is delivered on the P-BCH (Case 1), the RE puncturing scheme of the BS cannot be applied to the P-BCH. Similarly, if the RE puncturing information is delivered on the S-BCH (Case 2), the RE puncturing scheme of the BS cannot be applied to the S-BCH. The BS uses RE puncturing in order to overcome the limitations of a total transmit power. Thus a maximal RE puncturing defined in the standards should be applied to the P-BCH in Case 1 and to the P-BCH and the P-SCH in Case 2.

For example, let the maximum RE puncturing be defined as transmission of RSs and puncturing of all the remaining REs in an OFDM symbol with RSs. Then only RSs are transmitted in an OFDM symbol with RSs on the P-BCH in Case 1 and on the P-BCH and the P-SCH in Case 2. Even if the maximum RE puncturing does not mean transmission of only RSs in an OFDM symbol with RSs, RE puncturing should be applied to a channel to be received before acquiring RE puncturing information in the most conservative manner. This conforms to the rule that the P-SCH, the S-SCH, and the P-BCH are transmitted at time instants in frequency bands all the time before the MS acquires information about a system bandwidth from the P-BCH.

Figure 6:
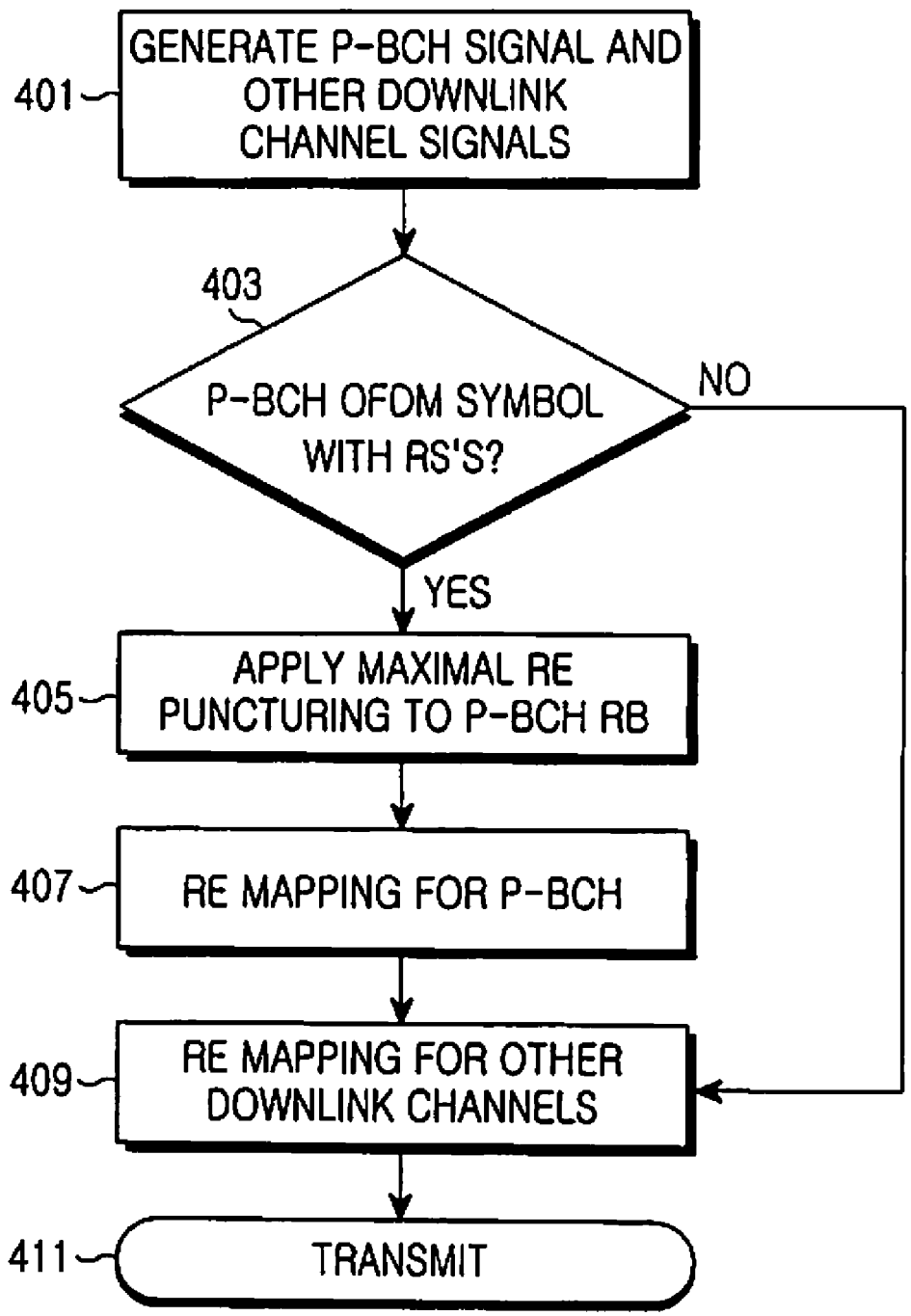
FIG. 6 is a flowchart illustrating a transmission operation of a BS when RE puncturing information is written in a P-BCH according to the present invention.

FIG. 6 illustrates a transmission operation of the BS in Case 1 where RE puncturing information is written in the P-BCH according to the present invention.

Referring to FIG. 6, the BS generates a P-BCH signal and other downlink channel signals in step 401 and determines whether a signal generated at a current time is a P-BCH OFDM symbol with RSs in step 403.

If the signal is a P-BCH OFDM symbol with RSs, the BS applies a maximal RE puncturing to the P-BCH OFDM symbol with RSs in an RB that defines the P-BCH in step 405 and performs RE mapping for the P-BCH in step 407. The RE mapping is re-arrangement of modulation symbols on non-punctured REs.

If the signal is not a P-BCH OFDM symbol, or after step 407, the BS performs RE mapping for the other downlink channels in step 409 and performs subsequent transmission processes in step 411.

Figure 7:
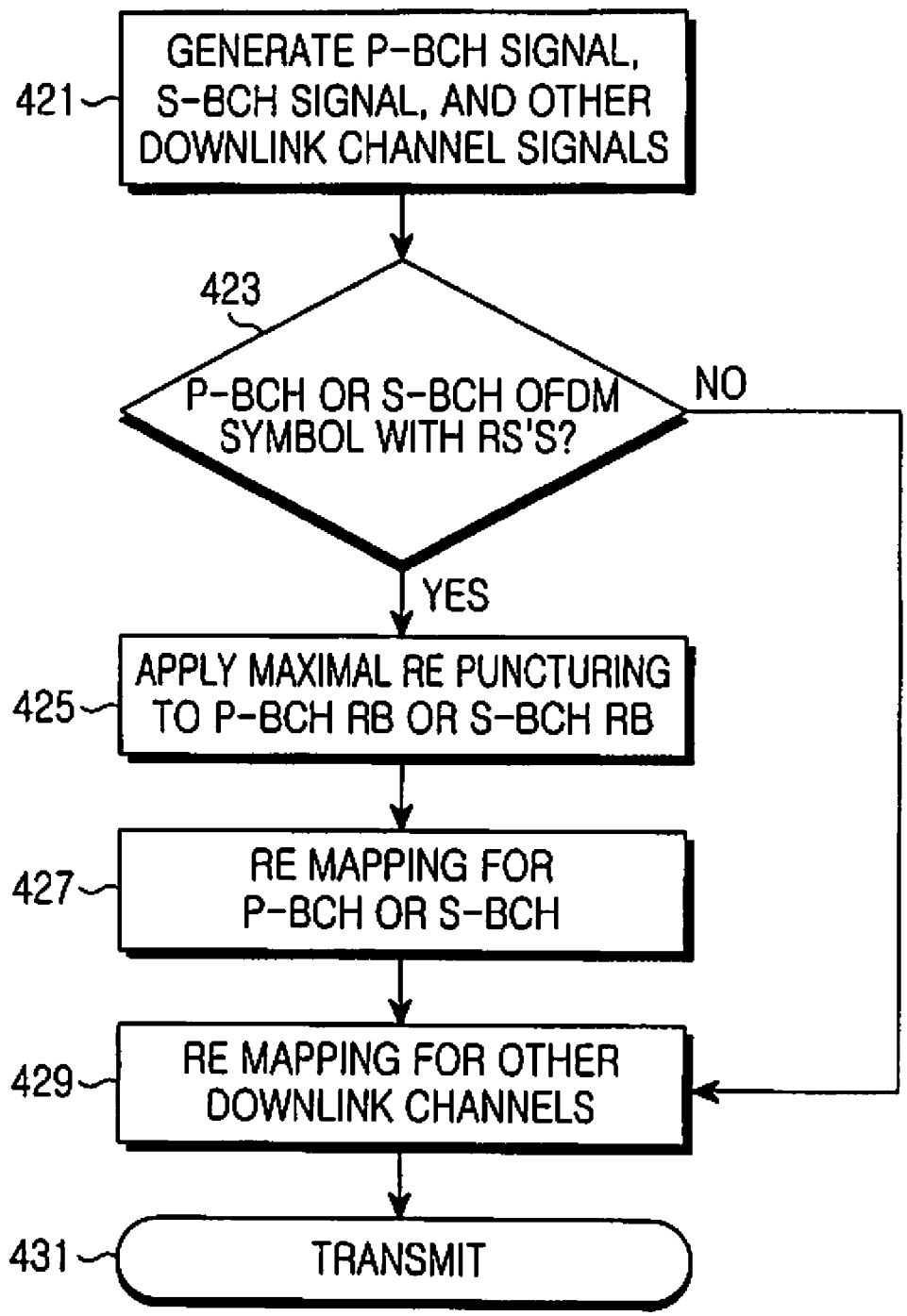
FIG. 7 is a flowchart illustrating a transmission operation of the BS when RE puncturing information is written in a Secondary Broadcast CHannel (S-BCH) according to the present invention.

FIG. 7 illustrates a transmission operation of the BS in case 2 where RE puncturing information is written in the S-BCH according to the present invention.

Referring to FIG. 7, the BS generates a P-BCH signal, an S-BCH signal, and other downlink channel signals in step 421 and determines whether a signal generated at a current time is a P-BCH or S-BCH OFDM symbol with RSs in step 423.

If the signal is a P-BCH or S-BCH OFDM symbol with RSs, the BS applies the maximal RE puncturing to the P-BCH or S-BCH OFDM symbol with RSs in an RB that defines the P-BCH or the S-BCH in step 425 and performs RE mapping for the P-BCH or the S-BCH in step 427. If the signal is neither a P-BCH OFDM symbol nor an S-BCH OFDM symbol, or after step 427, the BS performs RE mapping for the other downlink channels in step 429 and performs subsequent transmission processes in step 431.

Figure 8:
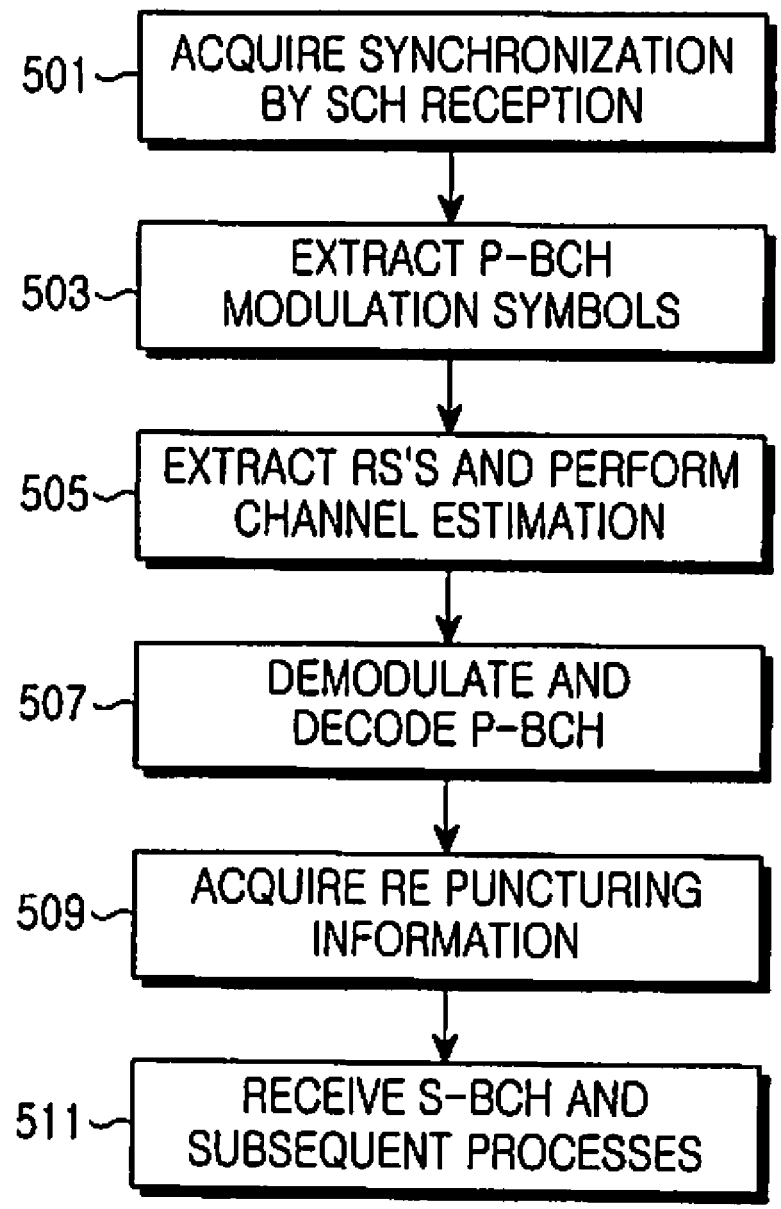
FIG. 8 is a flowchart illustrating a reception operation of an MS when RE puncturing information is written in the P-BCH according to the present invention.

FIG. 8 illustrates a reception operation of the MS in Case 1 where RE puncturing information is written in the P-BCH according to the present invention.

Referring to FIG. 8, the MS acquires synchronization by receiving a P-SCH and an S-SCH and obtains information required for P-BCH reception in step 501. In step 503, the MS extracts P-BCH modulation symbols, considering the maximal RE puncturing in an RB that defines the P-BCH. The MS extracts RSs and performs channel estimation using the RSs in step 505 and acquires P-BCH information by demodulating and decoding the P-BCH based on the channel estimate in step 507. The P-BCH information includes RE puncturing information. Thus, the MS acquires the RE puncturing information in step 509 and receives an S-BCH and performs subsequent processes in step 511.

Figure 9:
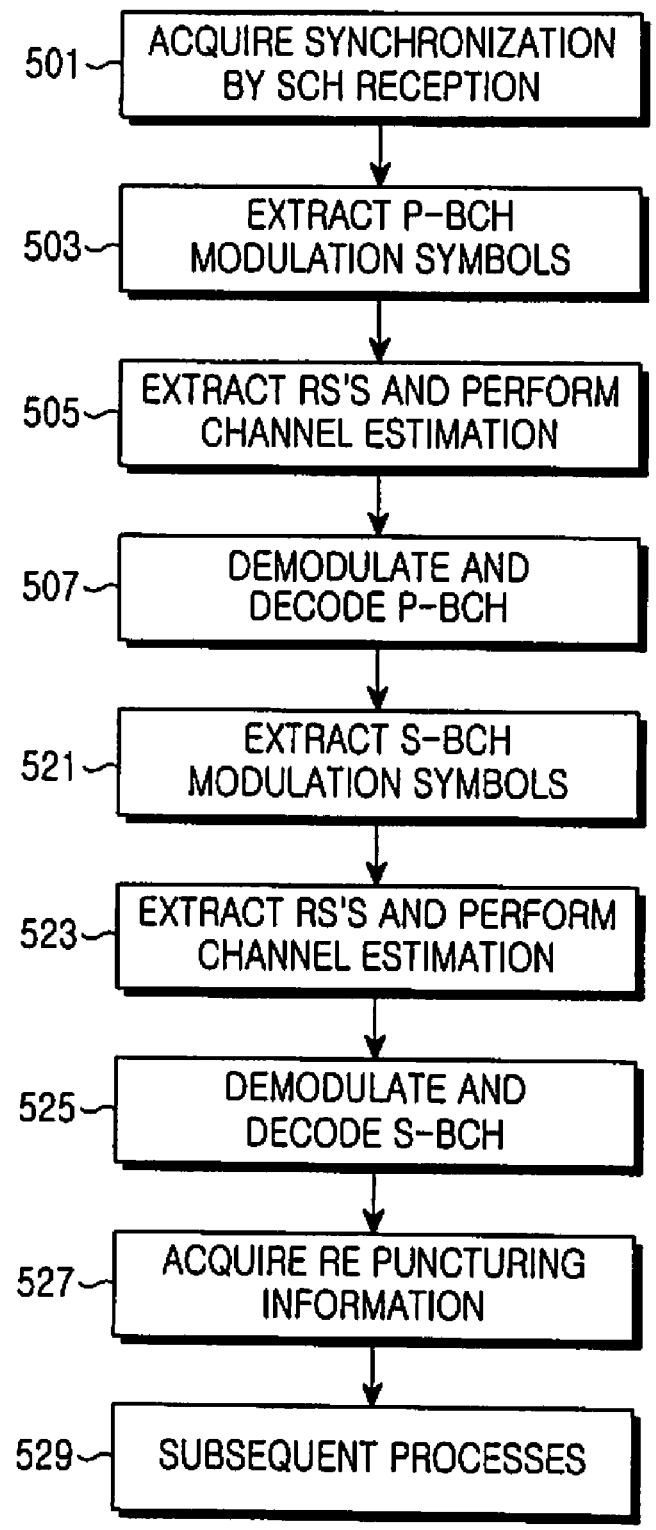
FIG. 9 illustrates a reception operation of the MS when RE puncturing information is written in the S-BCH according to the present invention.

FIG. 9 illustrates a reception operation of the MS in Case 2 where RE puncturing information is written in the S-BCH according to the present invention.

Referring to FIG. 9, steps 501 to 507 for receiving the SCHs and demodulating and decoding the P-BCH are performed in the same manner as in steps 501 to 507 of FIG. 8 and thus their description will not be provided herein. After acquiring P-BCH information, the MS extracts S-BCH modulation symbols, considering the maximal RE puncturing in an RB that defines the S-BCH in step 521. In step 523, the MS extracts RSs in a transmission period of the S-BCH and performs channel estimation for S-BCH demodulation. The MS demodulates and decodes the S-BCH based on the channel estimate in step 525, acquires RE puncturing information in step 527, and performs subsequent processes in step 529.

Figure 10:
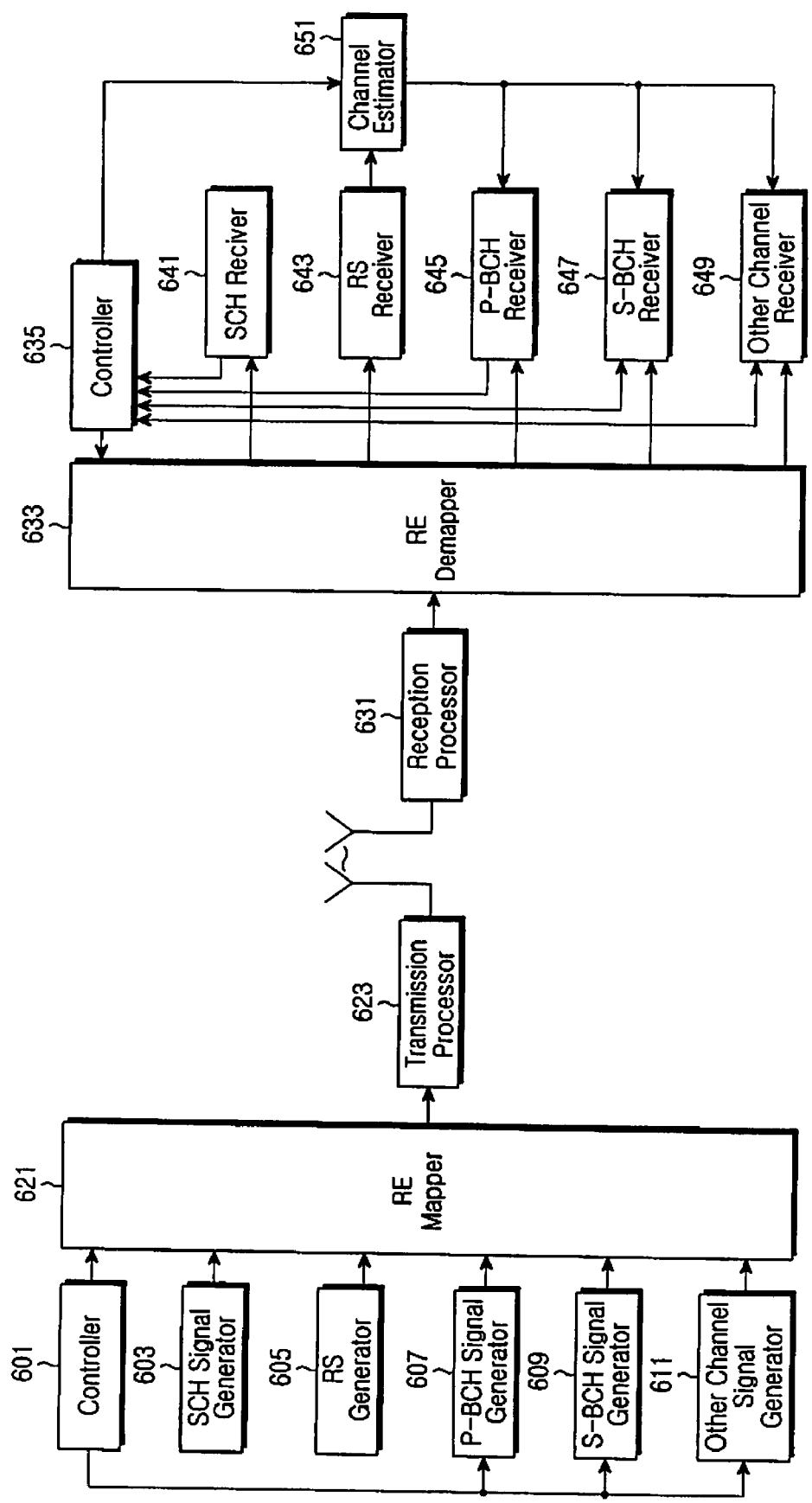
FIG. 10 is a block diagram of a transmitter and a receiver according to the present invention.

FIG. 10 is a block diagram of a transmitter and a receiver according to the present invention.

The transmitter includes a controller 601, an SCH signal generator 603, an RS signal generator 605, a P-BCH signal generator 607, an S-BCH signal generator 609, and an other channel signal generator 611. The transmitter further includes an RE mapper 621 for multiplexing signals generated from the signal generators 603 to 611, and a transmission processor 623. The RE mapper 621 multiplexes a signal mapped to fixed resources, such as an SCH or a P-BCH, a signal mapped to variable resources such as an S-BCH, and a signal mapped to resources by scheduling, such as a data signal. The transmission processor 623 transmits the multiplexed signal after processing it by, for example, Inverse Fast Fourier Transform (IFFT), Cyclic Prefix (CP) addition and Radio Frequency (RF) processing.

The receiver includes a reception processor 631, an RE demapper 633, a controller 635, an SCH receiver 641, an RS receiver 643, a P-BCH receiver 645, an S-BCH receiver 647, an other channel receiver 649, and a channel estimator 651. The reception processor 631 processes a received signal by, for example, RF processing, CP elimination and Fast Fourier Transform (FFT), and the RE demapper 633 demaps symbols from REs on a channel basis. The channel receivers 641 to 649, the RE demapper 633, and the reception processor 631 operate under the control of the controller 635.

For example, when synchronization information and system information are acquired in the SCH receiver 641, the controller 635 controls other channel receivers by the synchronization information and the system information. Meanwhile, the RS receiver 643 provides received RSs to the channel estimator 651. The channel estimator 651 can compute channel estimates required for receiving the P-BCH, the S-BCH, and other channels.

As is apparent from the above description, the present invention applies a maximal RE puncturing to an RB including a BCH that an MS will receive before acquiring RE puncturing information. Therefore, obscurities regarding RE puncturing are eliminated between a BS transmitter and an MS receiver. Also, the use of the maximal RE puncturing prevents the shortage of transmit power in an OFDM symbol with RSs.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:

1. A method for transmitting data to a Mobile Station (MS) in a Base Station (BS) in an Orthogonal Frequency Division Multiplexing (OFDM) system, the method comprising:
   generating a broadcast channel signal;
   determining whether the broadcast channel signal includes Reference Symbols (RSs) used for channel estimation;
   determining to apply a maximal puncturing pattern to a Resource Block (RB) that defines the broadcast channel, if the broadcast channel signal includes the RSs;
   including in the broadcast channel signal puncturing information about a downlink signal and mapping the broadcast channel signal including the puncturing information to Resource Elements (REs) according to the maximal puncturing pattern; and
   transmitting the mapped broadcast channel signal.

2. The method of claim 1, wherein the mapping comprises puncturing all REs except the REs to which the broadcast channel signal including the puncturing information is mapped in an RB that carries the puncturing information.

3. The method of claim 1, wherein the broadcast channel is one of a first broadcast channel and a second broadcast channel, and the mapping comprises mapping the broadcast channel signal including the puncturing information to the REs corresponding to one of the first and second broadcast channels according to the maximal puncturing pattern.

4. A method for receiving data from a Base Station (BS) in a Mobile Station (MS) in an Orthogonal Frequency Division Multiplexing (OFDM) system, the method comprising:
   acquiring synchronization from a signal received on a synchronization channel;
   extracting modulation symbols of a first broadcast channel from a Resource Block (RB) that defines the first broadcast channel, where a maximal puncturing pattern was applied to the RB that defines the first broadcast channel;
   extracting Reference Symbols (RSs) for channel estimation of the first broadcast channel from the RB that defines the first broadcast channel, and estimating a state of the first broadcast channel using the RSs;
   demodulating and decoding a signal of the first broadcast channel using the estimated result of the first broadcast channel;
   acquiring puncturing information about a downlink signal from the decoded first broadcast channel signal; and
   receiving a signal of a second broadcast channel using the puncturing information.

5. The method of claim 4, further comprising, if the puncturing information is not acquired from the decoded first broadcast channel signal:
   extracting modulation symbols of the second broadcast channel from an RB that defines the second broadcast channel, where the maximal puncturing pattern was applied to the RB that defines the second broadcast channel;
   extracting RSs for channel estimation of the second broadcast channel from the RB that defines the second broadcast channel, and estimating a state of the second broadcast channel using the RSs;
   demodulating and decoding a signal of the second broadcast channel using the estimated result of the second broadcast channel;
   acquiring the puncturing information from the decoded second broadcast channel signal; and
   receiving a channel signal other than the first and second broadcast channels using the puncturing information.

6. The method of claim 4, wherein the modulation symbol extraction includes where all REs except REs to which the first broadcast channel signal including the puncturing information is mapped are punctured in an RB that carries the puncturing information, according to the maximal puncturing pattern.

7. An apparatus for transmitting data to a Mobile Station (MS) in a Base Station (BS) in an Orthogonal Frequency Division Multiplexing (OFDM) system, the apparatus comprising:
   a Reference Symbol (RS) generator for generating RSs for channel estimation;
   a synchronization channel signal generator for generating a synchronization channel signal required for the MS to acquire synchronization to the BS;
   a broadcast channel signal generator for generating a broadcast channel signal including system information and Resource Element (RE) puncturing information based on RS power allocation;
   a mapper for mapping the RSs, the synchronization channel signal, the broadcast channel signal received from the RS generator, the synchronization channel signal generator, and the broadcast channel signal generator to allocated resources, multiplexing the mapped signals, and transmitting the multiplexed signal to the MS; and
   a controller for controlling the mapper to apply a maximal puncturing pattern to a Resource Block (RB) that defines a broadcast channel, if the broadcast channel signal includes RSs.

8. The apparatus of claim 7, wherein the controller controls the mapper to puncture all REs except REs to which the broadcast channel signal including the RE puncturing information is mapped in an RB that carries the RE puncturing information.

9. The apparatus of claim 7, wherein the broadcast channel is one of a first broadcast channel and a second broadcast channel, and the controller controls the mapper to map the broadcast channel signal including the RE puncturing information to REs corresponding to one of the first and second broadcast channels according to the maximal puncturing pattern.

10. An apparatus for receiving data from a Base Station (BS) in a Mobile Station (MS) in an Orthogonal Frequency Division Multiplexing (OFDM) system, the apparatus comprising:
- a demapper for demapping symbols from a multiplexed signal received from the BS on a channel basis;
- a synchronization channel receiver for acquiring information for synchronization to the BS from the demapped symbols;
- a Reference Symbol (RS) receiver for acquiring RSs for channel estimation from the demapped symbols;
- a broadcast channel receiver for acquiring, from the demapped symbols, system information and Resource Element (RE) puncturing information based on power allocation to the RSs;
- a channel estimator for calculating a channel estimate for receiving a synchronization channel signal and a broadcast channel signal using the RSs; and
- a controller for controlling the demapper to extract modulation symbols of a broadcast channel in a Resource Block (RB) that defines the broadcast channel, assuming that a maximal puncturing pattern was applied to the RB that defines the broadcast channel.

11. The apparatus of claim 10, wherein the broadcast channel is one of a first broadcast channel and a second broadcast channel, and the demapper extracts modulation symbols of the first broadcast channel in an RB that defines the first broadcast channel, where the maximal puncturing pattern was applied to the RB that defines the first broadcast channel and the broadcast channel receiver acquires the RE puncturing information from the first broadcast channel.

12. The apparatus of claim 11, wherein if the broadcast channel receiver does not acquire the RE puncturing information from the first broadcast channel, the demapper extracts modulation symbols of the second broadcast channel from an RB that defines the second broadcast channel, where the maximal puncturing pattern was applied to the RB that defines the second broadcast channel, and the broadcast channel receiver acquires the RE puncturing information from the second broadcast channel.

13. The apparatus of claim 10, wherein the demapper considers that all REs except REs to which the broadcast channel signal including the RE puncturing information is mapped are punctured in an RB that carries the RE puncturing information, according to the maximal puncturing pattern.

* * * * *